UNITED STATES PATENT OFFICE.

FREDERICK M. RUSCHHAUPT, OF MILWAUKEE, WISCONSIN.

COMPOUND FOR PROTECTING WALLS.

SPECIFICATION forming part of Letters Patent No. 350,083, dated September 28, 1886.

Application filed January 2, 1886. Serial No. 187,493. (No specimens.)

*To all whom it may concern:*

Be it known that I, FREDERICK M. RUSCHHAUPT, of Milwaukee, in the county of Milwaukee and State of Wisconsin, have invented a new and useful Compound for Protecting Walls, of which the following is a full, clear, and exact description.

The object of my invention is to render the surface of brick, stone, terra-cotta, and similar building material water-proof, so as to prevent the discoloration of walls by efflorescence of salts dissolved out of the building material or the cement employed in laying the wall. It is well known that efflorescence or the so-called "whitening" of walls results from a solution of salts from the stone or brick or cement employed in laying the stone or brick, this solution being effected by water absorbed by the material of the wall, the salts being left on the surface of the wall after the evaporation of the water. The water which reaches and dissolves these salts enters the brick or stone by capillarity, and transfers the salts to the surface of the wall, where they are left after the evaporation of the water. It is obvious that by rendering the brick, terra-cotta, stone, or other building material non-porous, or by destroying its capillary action, the efflorescence or whitening of the wall may be prevented.

I am aware that it is not new to apply linseed-oil to walls, and that it is common to apply paraffine to walls after they have been heated; but the result of these applications has been unsatisfactory. The linseed-oil is soon affected by oxidation, and is rendered more or less susceptible to the action of water, and its repulsion toward water is destroyed. The application of paraffine to walls requires the previous heating of the wall, which is often impracticable, and always expensive and troublesome.

My improved compound, which is designed to overcome these difficulties, consists of the following ingredients, combined in variable proportions: common rosin, fifty pounds; paraffine, (crude or refined,) or, in lieu thereof, vaseline or any similar solid or semi-solid hydrocarbon, four pounds; or in lieu of paraffine, &c., a solid or semi-solid fat—as stearine, tallow, or grease—five pounds; linseed-oil, five pounds; sulphur, five pounds; gasoline, benzine, kerosene, turpentine, or other solvent, ten gallons.

My improved compound is prepared as follows: The rosin is crushed or granulated, and is agitated in a closed vessel with the solvent. To this mixture I add the paraffine or equivalent hydrocarbon, or in lieu thereof the solid or semi-solid fat, allowing it to dissolve in the solvent. I then add about twenty-five per cent. of sulphur balsam, which is prepared by heating the sulphur with the linseed-oil in the usual well-known way. After the addition of the sulphur balsam I agitate the whole until all the ingredients are completely dissolved. When the wall or material to which the compound is applied is not extremely porous, I omit the sulphur balsam and apply simply the solution of the rosin and the hydrocarbon, or the solution of the rosin and the solid or semi-solid fat; but where the wall or material is very porous I introduce the sulphur balsam, and in some cases I increase the quantity of the rosin and the solid or semi-solid hydrocarbon. When the compound requires dilution I introduce more gasoline or benzine, or use petroleum, kerosene, or other solvent as a diluting agent.

My improved compound is applied to the wall or material by means of a suitable brush, when it will be readily absorbed by the brick or stone, and it is applied repeatedly until the outer part of the wall is completely saturated with the compound and the pores of the brick or stone are filled. Should the last coat of the compound remain upon the surface of the wall, the surplus may be removed by the application of gasoline, benzine, or other solvent, leaving the surface of the brick or stone in its natural condition without any gloss. The great liquidity and low specific gravity of the gasoline, and its quality as a solvent of the solid or semi-solid substances entering into the compound, render it a most efficient agent for conveying the solid materials into the pores of the brick or stone. The pinic, sylvic, and pimaric acids of the rosin will gradually combine with the magnesia and lime present in the mortar, cement, brick, &c., forming insoluble combinations of a dense and tenacious nature, adding thus materially to the value of the compound.

The compound thus made and applied not only repels the water and prevents it from entering the pores of the material of the wall, but it acts as a preservative, and is efficient in all weathers and in all climates.

Having thus described my invention, what I claim as new, and desire to secure by Letters Patent, is—

1. A compound for protecting walls, which consists of rosin, a solid or semi-solid hydrocarbon, or in lieu thereof a solid or semi-solid fat, and a solvent, combined in about the proportions stated.

2. A compound for protecting walls, consisting of rosin, a solid or semi-solid hydrocarbon, or in lieu thereof a solid or semi-solid fat, a solvent, and sulphur balsam, combined in about the proportions stated.

FREDERICK M. RUSCHHAUPT.

Witnesses:
G. STEINHAGEN,
G. E. CRAIN.